E. R. HEWITT.
HYDRAULIC BRAKE FOR WORM DRIVES FOR AUTOMOBILES.
APPLICATION FILED MAY 14, 1917.

1,259,863.

Patented Mar. 19, 1918.

Inventor
Edward R. Hewitt
By
Attorney

UNITED STATES PATENT OFFICE.

EDWARD R. HEWITT, OF MIDVALE, NEW JERSEY.

HYDRAULIC BRAKE FOR WORM-DRIVES FOR AUTOMOBILES.

1,259,863.      Specification of Letters Patent.   Patented Mar. 19, 1918.

Application filed May 14, 1917. Serial No. 168,542.

*To all whom it may concern:*

Be it known that I, EDWARD R. HEWITT, a citizen of the United States, residing at Midvale, in the State of New Jersey, have invented certain new and useful Improvements in Hydraulic Brakes for Worm-Drives for Automobiles, of which the following is a specification, reference being had to the accompanying drawings, forming a part hereof.

This invention relates generally to a hydraulic brake designed for application to a worm drive as now generally employed in automobile practice. Such drives are found most frequently in motor trucks. The primary object of the invention is to incorporate in such worm drive without sacrifice of the mechanical compactness or change in the mechanical structure a hydraulic pump which shall be connected operatively to the worm drive shaft and serve to force a suitable liquid through a conduit which may be formed as a by-pass and the effective cross-sectional diameter of which may be controlled manually to permit regulation of the braking effort. In accordance with the invention, advantage is taken of the necessary extension of the worm shaft beyond the worm into its end bearing for association therewith of the said gear pump, the housing for the worm gear being suitably extended, if necessary, to house the improvements properly. The details of one practical commercial form of the invention will appear at greater length in connection with the description of the annexed drawings, in which—

Figure 1:
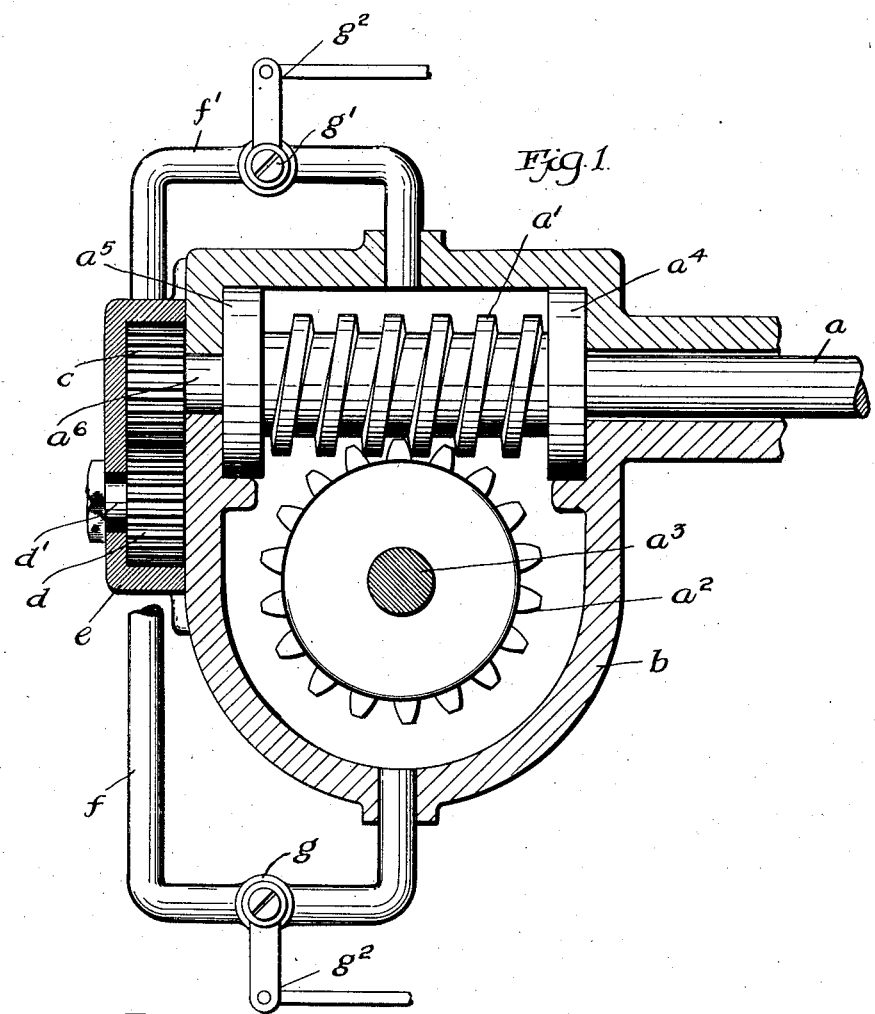
Figure 1 is a view, somewhat conventional, partly in side elevation and partly in vertical section, through a gear housing in which is shown the improved pump.
Figure 2:
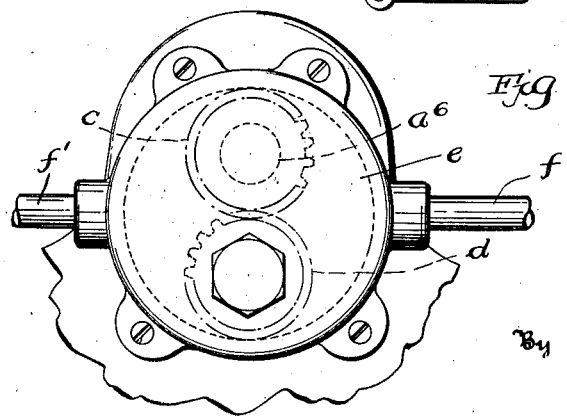
Fig. 2 is a fragmentary view in end elevation of a part of the housing shown in Fig. 1 and illustrating the relation of the pump gears to the worm shaft.

As shown in the drawings, the drive shaft $a$ carries adjacent its end a worm $a'$ which meshes with a worm wheel $a^2$ fixed to the usual axle section $a^3$ by which the motor vehicle is propelled. The worm shaft may have bearings $a^4$, $a^5$ in a suitable housing $b$. The end bearing $a^5$ must be formed, of course, on an extension of the shaft $a$ beyond the worm $a'$, so that in automobile practice it always follows that there is a short shaft section available at the end of the worm shaft and beyond the worm. This short shaft section beyond the worm $a'$ bears in the end wall of the housing $b$. The present invention has for its primary object to take advantage of this inherent characteristic construction of worm drives and associate with the short shaft section a brake which will be effective in its action and will apply the braking effort directly to the drive shaft itself. It follows that such a braking action will be most effective. In the illustrated embodiment the short shaft section $a^6$ in the end wall of the casing $b$ is of such length as to receive on its end a pump gear $c$ and this pump gear may coöperate with a complementary pump gear $d$ supported on a stub shaft $d'$, these two gears being disposed within a housing $e$ carried or formed integral with the main housing $b$. The two gears $c$, $d$ are, of course, of such construction and housed in such relation to each other and their housing $e$ as to constitute a hydraulic pump. With the casing $e$ and the housing $b$ may communicate conduits $f$, $f'$ which lead into the casing $e$ at opposite sides of the gears $c$, $d$ and form with the casing $e$ and the housing $b$ a continuous channel for the passage of a suitable liquid. The housing $b$, it is to be noted, has no other communication with the casing $e$, so that the liquid is forced, upon the operation of the gear pumps $c$, $d$ to follow the conduits $f$, $f'$. This liquid may, for convenience, be oil of suitable grade which will serve not only to lubricate the parts but to give the braking action to be described. In one or both of the conduits $f$, $f'$ are mounted suitable valves $g$, $g'$, which may be connected by linkage $g^2$ to any convenient operating lever at any desired part of the motor vehicle, so as to facilitate manipulation of these valves by the driver. These valves are of such construction that they will permit the conduits $f$, $f'$ to be closed to a certain predetermined minimum or to be opened somewhat fully to permit the comparatively free flow of the liquid therethrough.

The operation of the brake from the description given should be clear. When the car is propelled forward by the drive shaft $a$, the pump gears $c$, $d$ are rotated and force the liquid continuously through the by-pass conduits $f$, $f'$, the casing $e$ and the housing $b$. When the operator moves the valves $g$, $g'$ to fully opened position, the passage of this liquid will be comparatively free so that no opposition is offered to the flow of the liquid under the impulse given by the pump. If, now, the operator, desires to brake the car, the valves $g$, $g'$ are closed to a greater or less extent, thereby retarding the flow of liquid through the channels $f$, $f'$ and offering such resistance to the pump action as will throw a braking effort on the propelling shaft $a$, thereby braking the car. It would not be desirable to have the flow cut off entirely by the valves $g$, $g'$ since the resistance offered to the pump might be so great as to stop the car entirely or to result in mechanical injury to the operating parts. Further, it will be evident to one skilled in the art that one of the valves $g$, $g'$ might be omitted, although braking efforts on both forward and reverse movements will be facilitated by providing both valves. Only one need be manipulated usually at a time.

The invention is not to be limited to the precise form and relative arrangement of parts since the principle of the invention may be put in practice by providing other equivalent elements which will perform the respective functions of the parts described herein.

I claim as my invention:

1. The combination of a worm shaft, a worm wheel meshed with the worm thereon, a housing for the worm and worm wheel, a hydraulic pump carried at the end of the worm shaft and having a housing and a valve controlled conduit between the first named housing and the pump housing through which a liquid may be impelled by the pump.

2. In a motor vehicle, the combination of a worm drive shaft, a worm wheel meshed with the worm thereon, a housing for the worm and worm wheel, a hydraulic pump gear carried on the end of the worm shaft, a coöperating pump gear, a housing in which the gears are mounted and a valve controlled conduit between the first named housing and the pump housing through which a liquid may be impelled by the pump.

3. In a motor vehicle, the combination of a worm drive shaft, a worm wheel meshed with the worm thereon, a housing for the worm and worm wheel, an end bearing for the worm shaft in the housing, a hydraulic pump gear carried on the end of the shaft beyond the worm, a housing for the pump gear, a coöperating pump gear in the last named housing, conduits between the housings, valves in the conduits and manually operable connections to said valves.

This specification signed this 10th day of May, A. D. 1917.

EDWARD R. HEWITT.